US009443733B2

(12) United States Patent
McKinley et al.

(10) Patent No.: US 9,443,733 B2
(45) Date of Patent: Sep. 13, 2016

(54) METHOD AND APPARATUS FOR AUTHENTICATING A SEMICONDUCTOR DIE

(71) Applicant: Marvell World Trade Ltd., St. Michael (BB)

(72) Inventors: Patrick A. McKinley, Corvallis, OR (US); Walter Lee McNall, Meridian, ID (US); Robert W. Shreeve, Corvallis, OR (US); Thomas Page Bruch, Corvallis, OR (US); Neal C. Jaarsma, Corvallis, OR (US)

(73) Assignee: Marvell World Trade Ltd., St. Michael (BB)

( * ) Notice: Subject to any disclaimer, the term of this patent is extended or adjusted under 35 U.S.C. 154(b) by 19 days.

(21) Appl. No.: 14/528,870

(22) Filed: Oct. 30, 2014

(65) Prior Publication Data

US 2015/0123702 A1    May 7, 2015

Related U.S. Application Data

(60) Provisional application No. 61/899,406, filed on Nov. 4, 2013, provisional application No. 61/899,417, filed on Nov. 4, 2013.

(51) Int. Cl.
*H01L 21/268* (2006.01)
*H01L 21/768* (2006.01)
*H03K 19/177* (2006.01)
*G06F 21/73* (2013.01)
*H01L 23/00* (2006.01)
*H01L 21/265* (2006.01)

(52) U.S. Cl.
CPC ............ *H01L 21/268* (2013.01); *G06F 21/73* (2013.01); *H01L 21/265* (2013.01); *H01L 21/76892* (2013.01); *H01L 23/576* (2013.01); *H03K 19/17768* (2013.01); *H01L 2924/0002* (2013.01)

(58) Field of Classification Search
None
See application file for complete search history.

(56) References Cited

U.S. PATENT DOCUMENTS

| 4,766,516 A | 8/1988 | Ozdemir et al. | |
| 7,423,288 B2* | 9/2008 | Aghababazadeh | G01R 31/2831 257/48 |
| 8,525,169 B1* | 9/2013 | Edelstein | H01L 23/544 257/48 |
| 2001/0045417 A1* | 11/2001 | Kapel | H01L 21/76894 219/121.68 |
| 2006/0221686 A1* | 10/2006 | Devadas | G06F 21/31 365/185.03 |

(Continued)

FOREIGN PATENT DOCUMENTS

| EP | 0441319 | 8/1991 |
| EP | 1530802 | 5/2005 |

OTHER PUBLICATIONS

"International Search Report and Written Opinion", Application No. PCT/IB2014/002983, Mar. 30, 2015, 10 Pages.

*Primary Examiner* — Crystal L Hammond

(57) ABSTRACT

The present disclosure describes apparatuses and techniques for device-based die authentication. In some aspects, an intensity of a particle beam is varied during semiconductor processing to provide a semiconductor die having devices of varied values. In other aspects, different areas of semiconductor dies are exposed during semiconductor processing to provide semiconductor dies with devices that vary in value from one die to the next. For each semiconductor die, a value generated based on the values of the die's respective devices can be associated with that die thereby enabling subsequent authentication of the semiconductor die.

20 Claims, 8 Drawing Sheets

(56) References Cited

U.S. PATENT DOCUMENTS

2008/0239269 A1* 10/2008 LaFontaine ............ B82Y 10/00
                                                      355/67
2013/0187764 A1* 7/2013 Smith .................. H04L 9/3271
                                                      340/10.42
2014/0093074 A1* 4/2014 Gotze ................... H04L 9/0866
                                                      380/45
2014/0312459 A1* 10/2014 Jezewski ............ H01L 23/5227
                                                      257/531
2015/0048515 A1* 2/2015 Zhang ................ H01L 23/5381
                                                      257/774

* cited by examiner

METHOD AND APPARATUS FOR AUTHENTICATING A SEMICONDUCTOR DIE

CROSS REFERENCE TO RELATED APPLICATIONS

This present disclosure claims priority to U.S. Provisional Patent Application Ser. No. 61/899,406 filed Nov. 4, 2013 and to U.S. Provisional Patent Application Ser. No. 61/899, 417 filed Nov. 4, 2013, the disclosures of which are incorporated by reference herein in their entirety.

BACKGROUND

Computing and electronic devices often exist within an ecosystem of accessories and consumable components, such as battery chargers, batteries, or inkjet cartridges. Typically, original equipment manufacturers (OEMs) of the devices also design and produce the accessories or consumable components to ensure compatibility and proper functionality with the devices. Additionally, some OEMs sell a device at a loss and recover the development and manufacturing costs of the device through sales of the device's accessories and consumable components. Competitors, however, often copy the OEM's accessories and consumable components to manufacture counterfeit versions, which are typically of lower quality (e.g., limited functionality or less capacity) and sold by the competitors at a lower price to gain market share. As such, the presence of these counterfeit accessories and consumable components in the market place impact not only the OEM's revenue stream, but also consumers who are unable to distinguish the OEM versions from the counterfeit versions of lower quality.

SUMMARY

The details of one or more implementations are set forth in the accompanying drawings and the description below. Other features and advantages will be apparent from the description and drawings. As such, this Summary should not be considered to describe essential features nor used to limit the scope of the claimed subject matter.

A method is described for applying, to a semiconductor layer of a die, a mask configured to expose areas of the semiconductor layer that correspond to devices of the die. The method then varies an intensity of a particle beam applied to the exposed areas of the semiconductor layer effective to vary respective values of the devices. The devices are part of circuit from which a numerical value is generated based on the respective values of the devices. The numerical value is then written a non-volatile memory of the die to associate the numerical value with the die for subsequent die authentication operations.

Another method is described for applying, to a semiconductor layer of multiple instances of a die, a mask configured to expose different areas of each instance's semiconductor layer. The different areas of each instance correspond to different subsets of devices that are defined by the structure of the die. The method then applies, to the different areas of the semiconductor layer, a particle beam effective to alter respective values of the different subsets of devices. For each instance of the die, a numerical value is generated based on the values of the instance's subset of devices. Each instance's numerical value is then written to its non-volatile memory to enable subsequent authentication of the instance of the die.

A System-on-Chip is described that includes unobservable logic devices and an authenticator that is configured to generate, via a circuit that includes the unobservable logic devices, a numerical value based in the respective values of the unobservable logic devices. The authenticator then compares the generated number with a reference number stored in a non-volatile memory of the System-on-Chip to determine if the System-on-Chip is authentic. If the generated number matches the reference number, the authenticator determines that the System-on-Chip is authentic and enables various functionalities thereof.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Conventional techniques for protecting information embedded in a chip (e.g., integrated-circuit die), often rely on increasing complexity of logic circuits that implement secret or secure functions of the chip. Advances in manufacturing capabilities enable chip designers to increase the complexity of the logic circuits as the physical size or pitch of circuit structures decrease. Typically, these increases in complexity have prevented, or at least delayed, chip counterfeiters from reverse engineering the identity, secret functions, or protocols of the chips they intend to clone.

Some of the chip counterfeiters, however, have implemented reverse engineering techniques that physically extract a genuine chip's circuitry and memory data, which enables the chip counterfeiters to design and produce more-exact counterfeit chips. Because these counterfeit chips are physically identical to the genuine chip (e.g., circuitry and memory data), the counterfeit chip's identity and capabilities may be identical to the genuine chip.

This disclosure describes apparatuses and techniques for device-based die authentication, which enable die or chip authentication based on values of unobservable semiconductor devices. In some aspects, areas of a chip's semiconductor layer(s) are modified to alter respective values of devices (e.g., capacitors, transistors, or diodes) that correspond with the areas. A unique value identifying the chip is then generated, based on the altered values of the respective devices, and stored to the chip's non-volatile memory for subsequent authentication. Because the afore-mentioned techniques of physical extraction rely on visibly detecting metallic circuit structures, cloned chips produced with uniform (e.g., unmodified) semiconductor layers will not generate the same unique value. Accordingly, even with identical metallic layers and memory data, the cloned chips produced by the chip counterfeiters will fail chip authentication or other functions that are based on values of a genuine chip's unobservable semiconductor devices.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
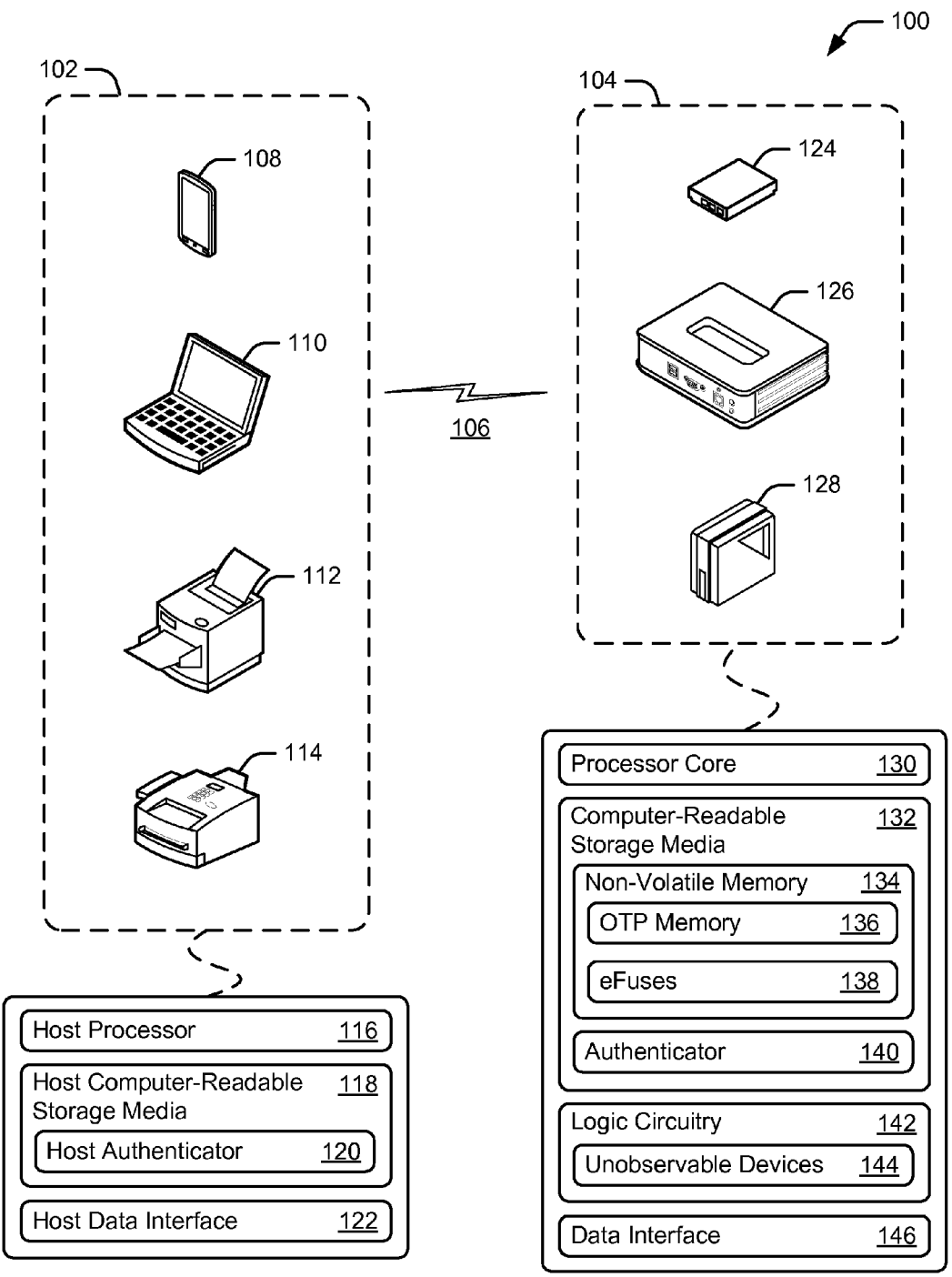
FIG. 1 illustrates an operating environment having host devices and peripheral devices in accordance with one or more aspects.

FIG. 1 illustrates an example of an operating environment 100 in which aspects of device-based die authentication can be implemented. As shown in FIG. 1, example operating environment 100 includes host devices 102 and peripherals 104, which may communicate with each other via communication link 106. In at least some aspects, host device 102 and peripheral 104 are configured for wired communication via communication link 106, which is implemented by a physical connection or contact between the device and peripheral. Alternately or additionally, host device 102 and peripheral 104 may be configured for wireless communication via communication link 106, which may be implemented by any suitable type of wireless connection.

Host devices 102 are each configured to provide or implement various functionalities or services, such as enabling data communication, presenting content, printing documents, and so on. In this particular example, host devices 102 include a smart-phone 108, laptop computer 110, ink jet printer 112, and multifunction printer 114. Although not shown, other configurations of host devices 102 are also contemplated, such as computers, servers, point-of-sale terminal, mobile-internet device (MID), gaming console, mobile hotspot, networked media player, home appliances, home automation systems, vehicles, and the like.

Each host device 102 includes host processor(s) 116 (e.g., an application processor) and host computer-readable storage media 118 (host CRM 118). Processor 116 may include any suitable number and/or type of processing cores, which may be configured in any suitable manner. Host CRM 118 may include any suitable type and/or combination of volatile memory and non-volatile memory (not shown), such as random-access memory (RAM), static random access memory (SRAM), or dynamic random-access memory (DRAM).

Host CRM 118 includes host authenticator 120, which in one implementation, is embodied on CRM 118. Although not shown, host CRM 118 may also include other data of host device 102, such as operating systems, applications, or user data. The operating systems or applications of the host device 102 may be stored by, or executed from, the volatile memory or the non-volatile memory of host CRM 118. The implementation and use of host authenticator 120 varies and is described below.

Host devices 102 also include host data interface 122, which enables communication with peripheral 104 via communication link 106. In some cases, host data interface 122 is a wired or physical interface, such as serial or parallel data interface that communicates through a connector, cable, or physical contacts. For example, host data interface 122 may be implemented as an integrated-circuit to integrated-circuit (I2C) bus interface that communicates through a set of conductive contacts. Alternately or additionally, host data interface 122 may be implemented as wireless interface, such as near-field communication (NFC) or short-range wireless transceiver.

Peripherals 104 are configured to expand, compliment, or enable various functionalities or services of host devices 102. Although referred to as peripherals herein, peripherals 104 may include accessories, expansion devices, replacement parts, replacement assemblies, consumable components, and the like. In this particular example, peripherals 104 include battery pack 124, docking station 126, and printer ink cartridge 128, which may be a single or multiuse ink cartridge. Although not shown, other configurations of peripherals 104 are also contemplated, such as a battery charger, multimedia cable (e.g., adapter or expansion), video game disc, video game controller, USB device, digital-video-disc (DVD), water filter cartridge, single-serving coffee container, automotive part or accessory, and the like.

Each peripheral 104 includes processor core 130 and computer-readable storage media 132 (CRM 132). Processor core 130 may include any suitable number and/or type of processing cores, which may be configured in any suitable manner (e.g., microprocessor, microcontroller, or digital-signal processor). CRM 132 includes non-volatile memory 134 and may include volatile memory (not shown), which may be implemented as any suitable type and/or combination of volatile memory. In this particular example, non-volatile memory 134 is embodied as one-time programmable memory 136 (OTP memory 136) and electronic fuses 138. Although not shown, CRM 118 may also include other data of peripheral 104, such as such as boot code, firmware, or identification information. CRM 132 also includes authenticator 140, which in one implementation, is embodied on CRM 132. The implementation and use of host authenticator 140 varies and is described below.

Peripherals 104 include logic circuitry 142, which includes various logic devices and hardware of the peripheral. For example, logic circuitry 142 may include circuits configured to implement various functions, such as encryption, authentication, security, and so on. Logic circuitry 142 also includes unobservable devices 144, which have values or functions that are difficult or impossible to observe, measure, or extract through conventional physical extraction techniques. The implementations and uses of unobservable devices 144 vary and are described below.

Data interface 146 of peripherals 104 enable communication with host devices 102 via communication link 106. In some cases, data interface 146 is a wired or physical interface, such as serial or parallel data interface that communicates through a connector, cable, or physical contacts. For example, date interface 146 may be implemented as a serial peripheral interconnect (SPI) bus interface that communicates through a set of conductive contacts. Alternately or additionally, data interface 146 may be implemented as wireless interface, such as near-field communication (NFC) or short-range wireless transceiver.

Communication link 106 may be implemented via any suitable wired or wireless medium, protocol, encoding, or encryption. For example, communication link 106 can support communication via an I²C bus, SPI bus, a low pin count (LPC) bus, universal asynchronous receiver/transmitter (UART) bus, 1-wire bus, USB, and the like. Alternately or additionally, communication link 106 may be implemented via proprietary protocol designed to protect the data communicated between host device 102 and peripheral 104.

Figure 2:
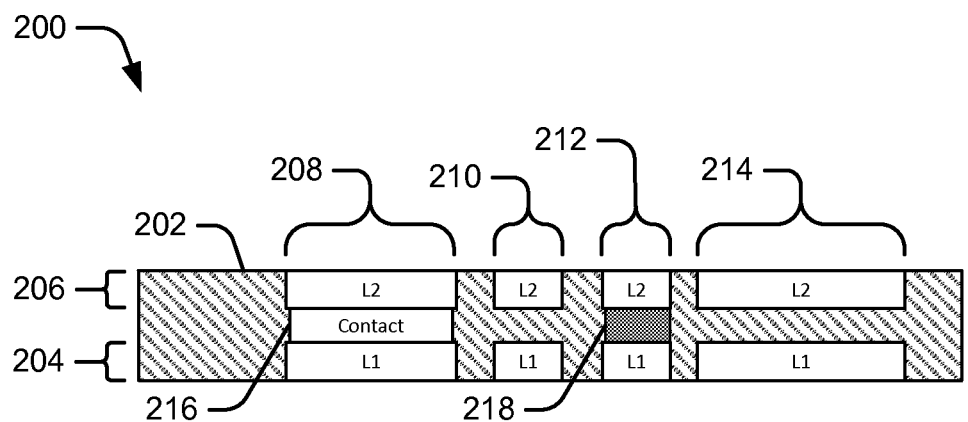
FIG. 2 illustrates example semiconductor structures in which unobservable devices can be implemented.
Figure 2:
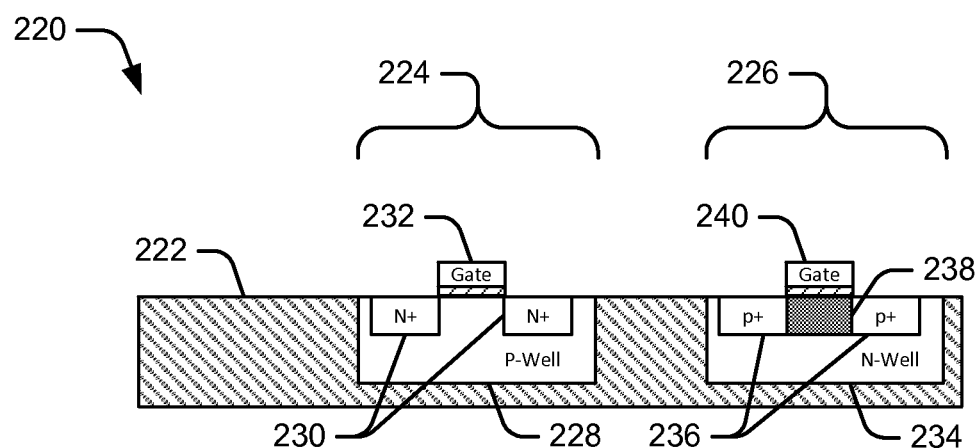

FIG. 2 illustrates example semiconductor structures in which unobservable devices, such as unobservable devices 144, can be implemented. These semiconductor structures can be implemented using any suitable type of semiconductor manufacturing, such as silicon, gallium (e.g., gallium arsenide), germanium, oxides, organic semiconductors, and so on. By way of example, consider circuit cross-section 200 of dielectric substrate 202 (e.g., a dielectric insulator), which can be manufactured using complementary metal-oxide-semiconductor (CMOS) silicon technology. Circuits and devices of dielectric substrate 202 are formed by varying metal layer 204 and metal layer 206, as well as materials interposed between the metal layers. The devices (e.g., microelectronic devices) of these circuits may include interlayer connections, diodes, transistors, capacitors, resistors, and inductors, some of which are illustrated by circuit cross-section 200.

Devices formed by metal layers 204 and 206 on dielectric substrate 202 include via 208 and capacitors 210, 212, and 214. Via 208 is an interlayer connection provided by conductive contact 216, which electrically connects a portion of metal layer 204 to a respective portion of metal layer 206. Capacitors 210, 212, and 214 are metal-insulator-metal capacitor devices having values that depend on their respective dimensions, geometries, and the dielectric material between their respective metal portions. Here, assume that respective metal portions of capacitor 210 and 212 have similar (or same) dimensions as shown in FIG. 2. Typically, due to their similar respective dimensions, capacitor 210 and 212 have a similar (or same) value when a uniform dielectric or semiconductor layer is interposed between metal layers 204 and 206.

In this particular example, however, dielectric material 218 between the metal layers of capacitor 212 is altered, such as by ion implantation to effect an amount of dielectric material 218's dopant. In such a case, capacitor 212 may be referred to as an unobservable device because the value of capacitor 212 is unobservable by traditional reverse engineering techniques such as de-processing or scanning-electron microscope (SEM) imaging. As such, the value of capacitor 212 would vary from a value estimated based on the dimensions of its respective portions of metal layers 204 and 206. For example, an actual value of capacitor 212 may correspond to a capacitor of smaller physical dimensions or larger physical dimensions, such as capacitor 214.

Unobservable devices may also be implemented through variations of p-n field effect transistor (FET) stacks or p-n diode stacks. By way example, consider circuit cross-section 220 of n-type bulk substrate 222, which includes n-type FET 224 and p-type FET 226. Typically, a particular type of FET is constructed on a well of oppositely doped silicon, a region of which is then adjusted or set for a desired threshold voltage. In this particular example, n-type FET 224 is constructed on p-type well 228 with n-type regions 230 functioning as a source and drain of the FET. To set a desired threshold for n-type FET 224, a region of the p-type well below gate 232 is adjusted via ion implantation such that n-type FET 224 functions at the desired threshold voltage.

Next, consider p-type FET 226, which is constructed on n-type well 234 with p-type regions 236 functioning as a source and drain for the FET. Typically, region 238 of n-type well 234, which is below gate 240, undergoes ion implantation to set a threshold voltage of p-type FET 226. In this particular example, however, the ion implantation process for region 238 is altered such that the voltage threshold of p-type FET 226 is different than other p-type FETs constructed on n-type bulk substrate 222. As such, p-type FET 226, or a similarly constructed n-type FET (e.g., altered sub-gate regions), may be referred to as an unobservable device because the threshold voltage, and therefore function of, p-type FET 226 is unobservable by traditional reverse engineering techniques.

Techniques of Device-Based Die Authentication

The following discussion describes techniques of device-based die authentication. These techniques can be implemented using the previously described environment or entities, such as host authenticator 120, authenticator 140, or unobservable devices 144 of FIG. 1 or the example semiconductor structures of FIG. 2. These techniques include methods illustrated in FIGS. 3, 5 and 7, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 and entities of FIG. 2 by way of example. Such reference is not to be taken as limited to operating environment 100 or structures of FIG. 2 but rather as illustrative of one of a variety of examples.

Figure 3:
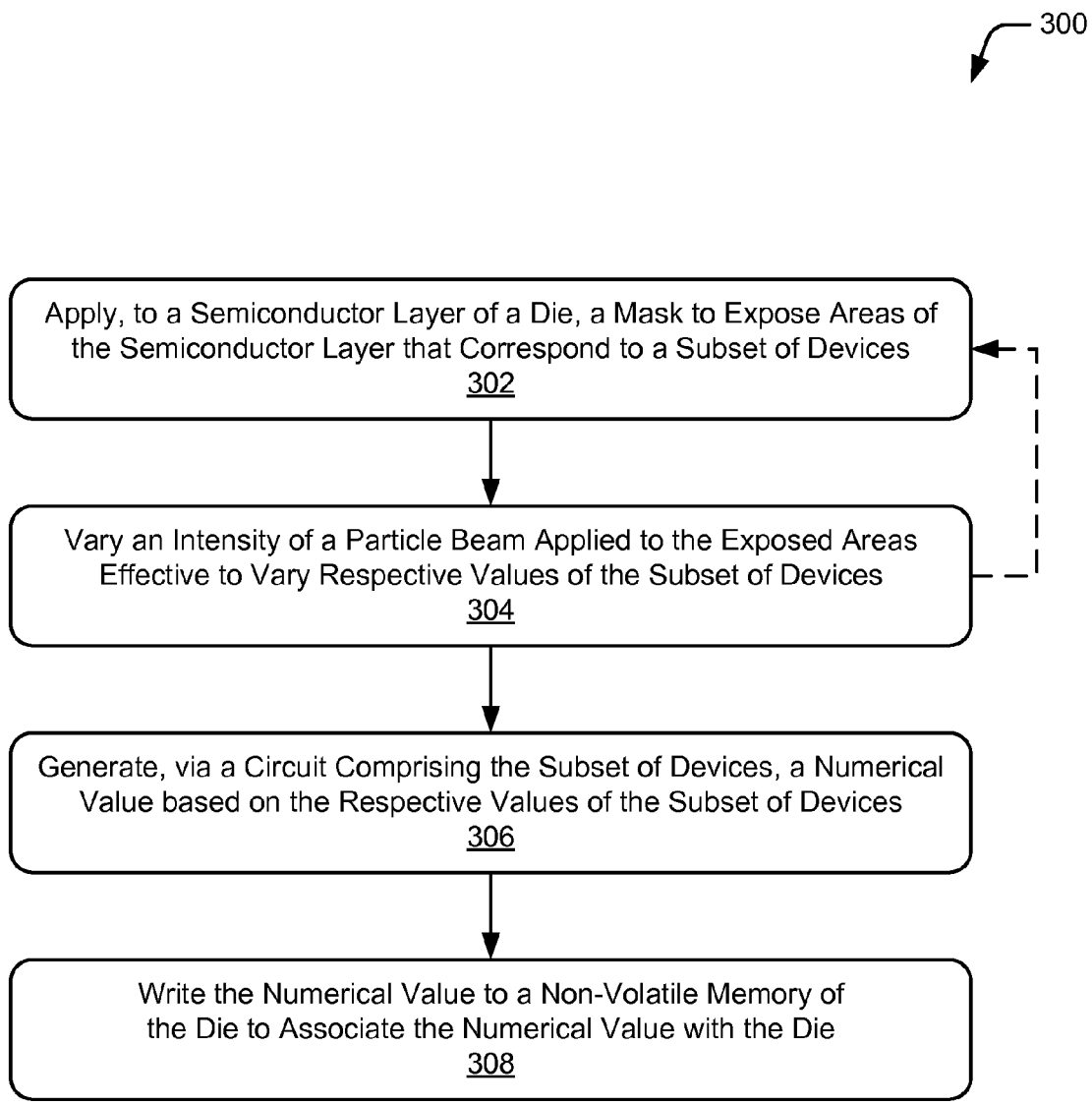
FIG. 3 illustrates an example method of varying an intensity of a particle beam to alter values of semiconductor devices.

FIG. 3 depicts a method 300 for varying an intensity of a particle beam to alter values of semiconductor devices, including operations performed to implement unobservable devices 144 of FIG. 1.

At 302, a mask is applied to a semiconductor layer of a die. The mask is configured to expose areas of the semiconductor layer that correspond to a subset of devices defined by the structure of the die. For example, the mask may expose areas of the semiconductor layer that correspond with a subset of the die's resistors or capacitors. For each device, the mask may be configured to expose an area of semiconductor or dielectric that is associated with the device and on which the device's value is based or effected. The mask may be applied to any suitable layer of the die, such as between two metal layers and before a via mask configured to connect the two metal layers. Although the die may include millions of devices, the mask may be configured to expose a relatively small number of devices, such as four, 16, 32, 64, or 128 of the devices.

Figure 4:
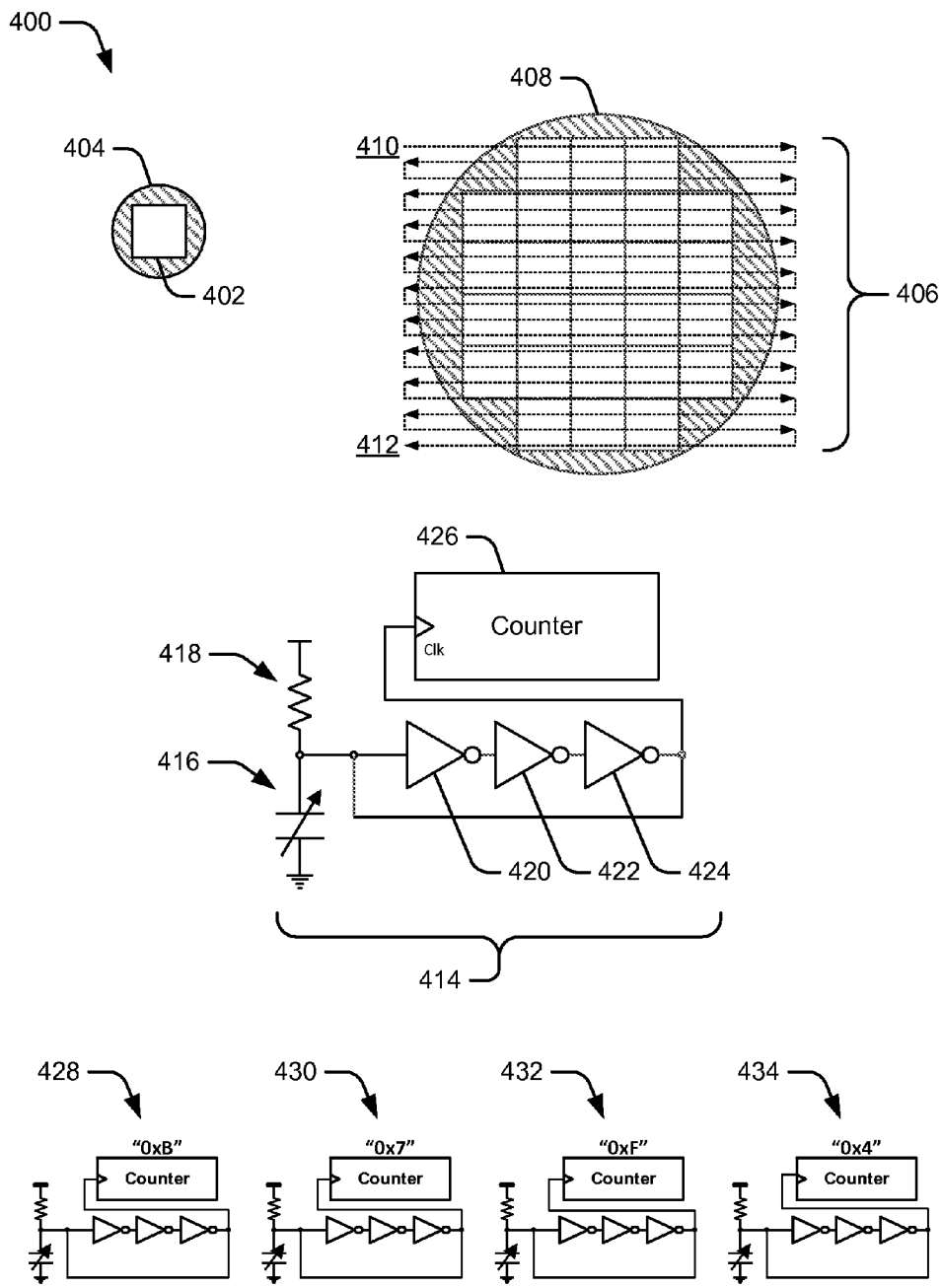
FIG. 4 illustrates an example die and logic circuit having unobservable semiconductor devices in accordance with one or more aspects.

By way of example, consider FIG. 4, which illustrates various aspects of a circuit die generally at 400. In the context of a single instance of a chip or circuit die, die 402 is manufactured on semiconductor wafer 404, such as a silicon wafer. When scaled to manufacture multiple instances of a die, die array 406 is arranged for fabrication on silicon wafer 408, which supports 26 instances of die 402. Here, a mask is applied to die array 406 to expose dielectric areas of each instance of the die that correspond to a subset of the die's capacitors.

At 304, an intensity of a particle beam applied to the exposed areas of the semiconductor layer is varied. This is effective to vary respective values of the subset of devices to which the exposed areas correspond. Because the semiconductor layer of the devices is varied to alter their respective values, the values of these devices are unobservable and the devices may be referred to as unobservable devices. In some cases, the particle beam is an ion particle beam and varying the intensity of the beam alters each area's density of dopant ions to effect the value of a corresponding device. The amount of dopant material implanted by an ion beam may be dependent on ion beam intensity as a function of time. Accordingly, the intensity of the ion beam or the rate at which the ion beam traverses the die (or silicon wafer) can be varied to alter the respective values of the subset of devices.

In some aspects, the intensity of the particle beam is varied randomly effective to provide a subset of devices having random values. In some cases, a range of values is controlled by setting a minimum and maximum intensity level for the particle beam. In such cases, the intensity of the particle beam can then be varied randomly between the minimum intensity level and the maximum intensity level as the ion beam traverses the die or silicon wafer. Alternately or additionally, an initial intensity level of the beam can be randomized for each wafer such that each wafer, and the dies thereof, have devices that are randomly valued and of different values from those of another wafer.

In the context of the present example, an ion beam traverses silicon wafer 408 from start point 410 to end point 412 implanting dopant ions in the exposed areas of die array 406. During traversal of silicon wafer 408, an intensity of the ion beam is varied randomly between a minimum intensity level and a maximum intensity level effective to randomly alter the values of the subset of capacitors that correspond with the exposed areas. In other words, each capacitor of the die receives a random amount of dopant material, which results in each capacitor having a random capacitance value.

From operation 304, method 300 may proceed to operation 306 or return to operation 302 to apply a mask to another semiconductor layer of the die. By repeating operations 302 and 304, values of additional devices on other layers of the die can be altered.

At 306, a numerical value is generated via a circuit comprising the subset of devices having the altered values. This numerical value is based on the respective altered values of the die's subset of devices. In some cases, such as when the values of devices are randomized, each die's subset of devices have values that are unique to that die. In such cases, the subset of devices may function as the die's signature or fingerprint because the devices, and the numerical value, are unique to that die. Alternately or additionally, the numerical value may be generated based on other values associated with a die, such as a serial number or encryption key.

The circuit in which the subset of devices is embodied may be any suitable type of circuit, such as a sensor circuit configured to sense, quantize, or measure the values of the devices. For example, a resistor-capacitor timing circuit or ring oscillator may be used to extract a digital value of one or more devices. Other circuits may compare a value of a device with a reference value to generate binary values (e.g., '1' or '0') based on the value of the device. The circuit may include any suitable number of devices, such as four, 16, 32, 64, and so on. Alternately or additionally, a value of each device may be sufficiently variable to have or encode up to 64 distinct values. By way of example, a circuit of four devices that each have a value range of 64 distinct values may generate over 16 million different numerical values ($64^4$ value combinations).

Continuing the ongoing example, die 402 includes ring oscillator circuit 414, which is configured to sense or measure a randomly altered value of capacitor 416 (e.g., unobservable capacitor). Ring oscillator circuit 414 includes capacitor 416 and resistor 418 as a resistor-capacitor (RC) network for the ring oscillator formed by inverters 420, 422, and 424. When power is applied to ring oscillator circuit 414, the output of inverter 424 oscillates based on the capacitance of capacitor 416. Counter 426 is operably connected to inverter 424 and counts the number of oscillations that occur over a duration of time to provide a numerical value. Assuming that counter 426 is a 4-bit counter, ring oscillator circuit 414 may provide up to 16 different values based on the randomly altered capacitance of capacitor 416.

Further, assume that die 402 includes four instances of an unobservable capacitor and an associated ring oscillator circuit, as illustrated by ring oscillator circuits 428, 430, 432, and 434. Once fabrication of die 402 is complete, these circuits are run for a predetermined amount of time to generate a numerical value is generated for die 402. Here, recall that the values of these unobservable capacitors are varied in a random fashion, which makes this numerical value unique to die 402. In the context of this example, the unique numerical value provided by ring oscillator circuits 428, 430, 432, and 434 is 0xB7F4 as shown above each counter in FIG. 4.

At 308, the numerical value is written to a non-volatile memory of the die to associate the numerical value with the die. This can be effective to enable subsequent authentication of the die based on the respective values of the subset of devices. In some cases, the numerical value, or signature of the die, is written to an OTP memory or eFuses of the die. In such cases, the numerical value may be stored with other die information, such as a unique serial identifier of the die or secret key information. When operating in a normal mode or mode in which special functions are enabled (e.g., mission mode), the die may re-generate the numerical value based on the devices and compare the re-generated value to the stored numerical value to self-authenticate.

Concluding the present example, the value provided by ring oscillator circuits 428, 430, 432, and 434, 0xB7F4, is written to one-time-programmable memory of die 402. By so doing, the unique numerical value of die 402 (e.g., signature or fingerprint) is associated with the die for subsequent authentication operations. Further, reverse engineering die 402 will fail to disclose the unobservable structures on which this numerical value is based. This can be effective to prevent chip counterfeiters from manufacturing clones that are able to generate a correct signature or fingerprint value.

Figure 5:
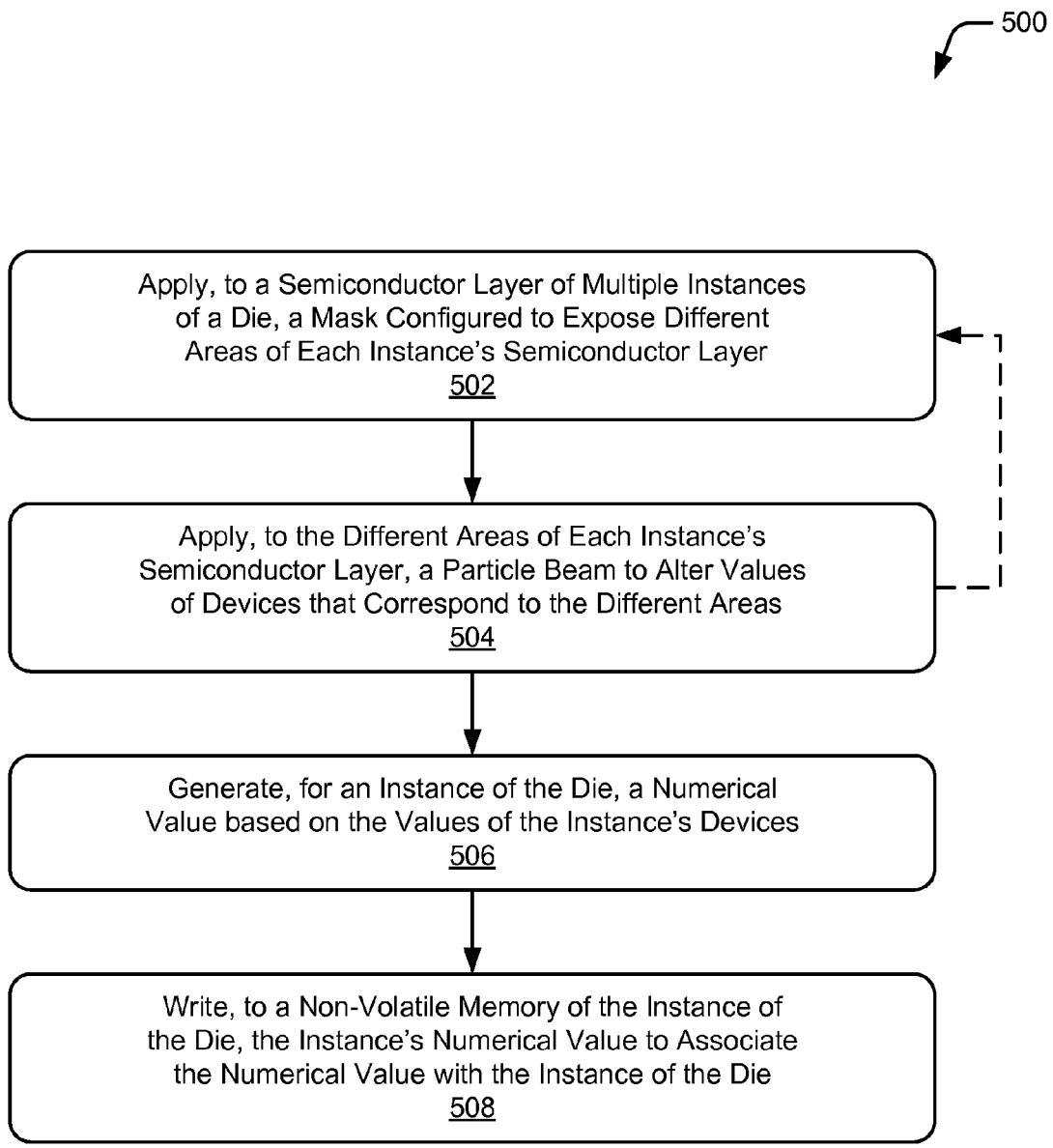
FIG. 5 illustrates an example method of altering values of different subsets of devices for different respective instances of a die.

FIG. 5 depicts a method 500 of altering, for different instances of a die, values of different subsets of devices, including operations performed to implement unobservable devices 144 of FIG. 1.

At 502, a mask is applied to a semiconductor layer of multiple instances of a die. The mask is configured to expose different areas of each instance's semiconductor layer, which correspond to different subsets of devices defined by the structure of the die. While the structure of the die may define millions of devices configured to implement various functionalities of the die, the different subsets of devices may include any suitable number or combination of devices, such as 16, 32, 64, and so on.

In some aspects, the multiple instances of the die are implemented as a die array instantiated via a photolithographic reticle. The die array may include any suitable number or arrangement of die instances, such as a maximum number of die instances that fit within a particular reticle image field. The photolithographic reticle, or field thereof, may then be stepped across a semiconductor wafer effective to expose the different areas of the semiconductor layer.

The devices defined by the structure of the die may include resistors, capacitors, transistors, or diodes. The values of these devices may depend on a dopant profile or implant of their respective semiconductor areas. For example, a threshold voltage of a transistor may depend on a dopant profile of the transistor's n-type well or p-type well. Alternately or additionally, the mask may be configured to expose other devices of the die and block different areas of each instance's semiconductor layer.

At 504, a particle beam is applied to the different areas of the semiconductor layer that are exposed by the mask. The application of the particle beam is effective to alter respective values of the different subsets of devices. For example, applying a beam of electrons (e.g., SEM e-beam) to silicon wells of FETs can alter a threshold voltage of the FETs. Alternately, blocking the beam of electrons at different areas of the semiconductor layer will provide FETs having threshold voltages different from the normally implanted FETs of the die. Because the semiconductor layer of the devices is varied to alter their respective values, the values of these devices are unobservable and the devices may be referred to as unobservable devices. In the case of FETs, surface dopant concentrations will likely not effect silicon etch rates and the SEM e-beam will penetrate deep enough to blur any visible differences in the threshold voltage doping profiles.

At 506, a numerical value is generated for an instance of the die based on the values of the instance's subset of devices. The numerical value is generated via one or more circuits that include the subset of devices (e.g., unobservable devices). The circuit(s) in which the subset of devices is embodied may be any suitable type of circuit, such as a sensor circuit configured to sense or measure the values of the devices. For example, a FET may provide a binary value of either a '1' or '0' based on whether a threshold voltage of the FET is altered. A circuit comprising 32 FETs may enable a code space of over approximately 4.3 million ($2^{32}$) unique numerical values for instances of the die on a single wafer.

Figure 6:
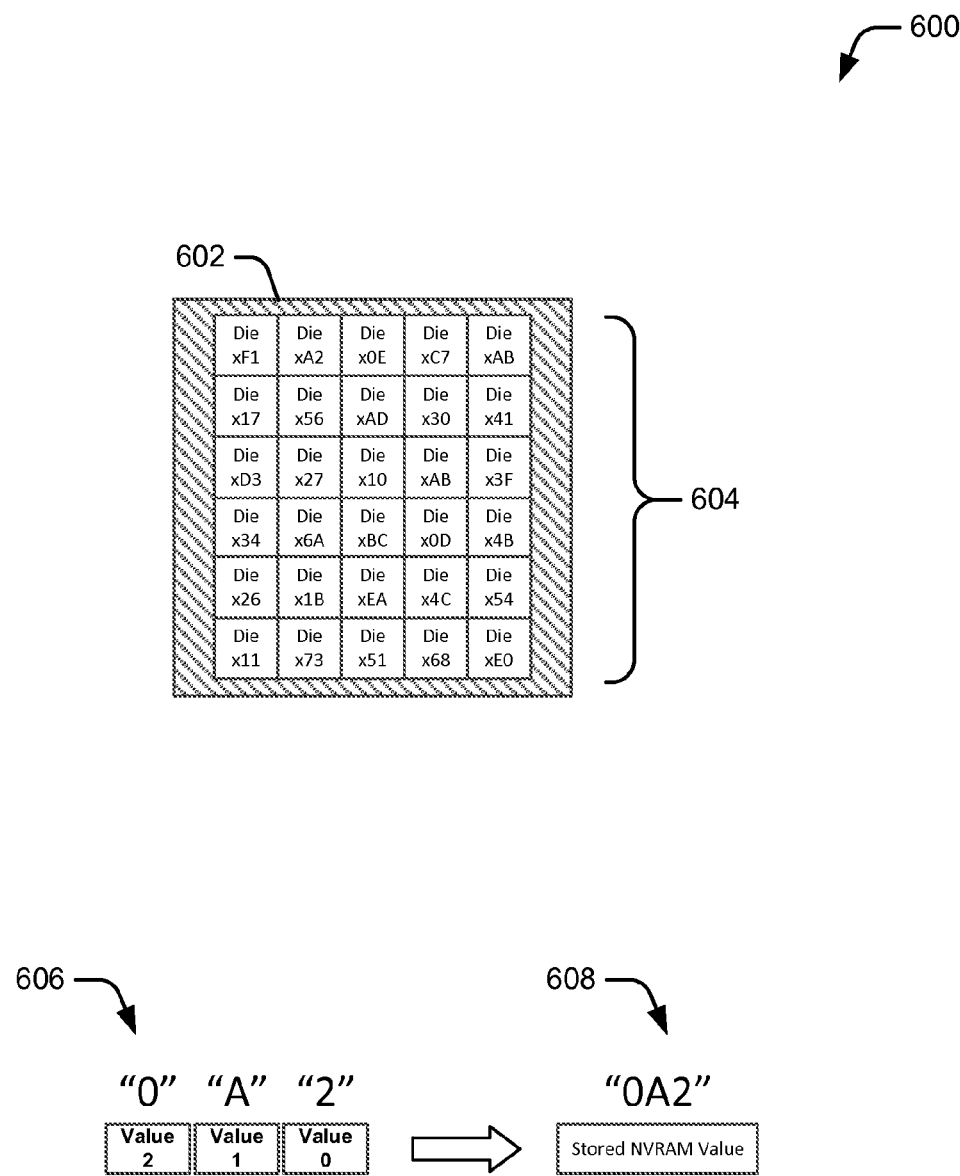
FIG. 6 illustrates an example array of dies embodied on a semiconductor wafer in accordance with one or more aspects.

By way of example, consider FIG. 6, which illustrates photolithographic reticle space 602 (reticle space 602) on which die array 604 is embodied. Although shown as a 5×6 array of die instances, die array 604 may be scalable up to any suitable number of die instances, such as 500 instances of a single die. In some cases, a number of the die instances is constrained by a maximum size of a reticle and a number of single die instances that fit within the reticle image field. Each die instance in die array 604 may have a unique or different numerical value as defined by instance's devices (e.g., photolithographic structures). During manufacture, reticle space 602 is stepped across a semiconductor wafer effective to produce multiple instances (e.g., one per step) of the unique die instantiated on the reticle. By so doing, the resulting plethora of die instances on the semiconductor wafer have a mixture of unique numerical values (e.g., serial numbers) among them.

To account for a number of possible numerical values required to vary each die from other instances on reticle space 602 (e.g., up to 500 instances), a circuit comprising 9 or 10 unobservable FETs can be used to generate the numerical values. Although using the 9 or 10 FETs enable 512 ($2^9$) or 1024 ($2^{10}$) unique values, respectively, these values may exist in a much larger code space (4.3 million ($2^{32}$) unique numerical values) when the die supports 32 unobservable FETs as previously mentioned. In the context of the present example and for the sake of brevity, two of the least significant hexadecimal values are shown for each instance of the die in FIG. 6.

At 508, the instance's numerical value is written to a non-volatile memory of the instance of the die to associate the numerical value with the instance of the die. This may also be effective to enable subsequent authentication of the die based on the instance's subset of devices and their respective values. In some cases, the numerical value, or signature of the die, is written to an OTP memory or eFuses of the die. In such cases, the numerical value may be stored with other die information, such as a unique serial identifier of the die or secret key information.

When operating in a normal mode or mode in which secret functions are enabled (e.g., mission mode), the die may re-generate the numerical value based on the devices and compare the re-generated value to the stored numerical value to self-authenticate. By so doing, a non-authentic die can be prevented from enabling a normal mode or mission mode of the die. Concluding the above example, numerical values 606 of the die is written into the die's non-volatile memory as numerical value 608 to enable subsequent authentication based on the die's unobservable devices.

Figure 7:
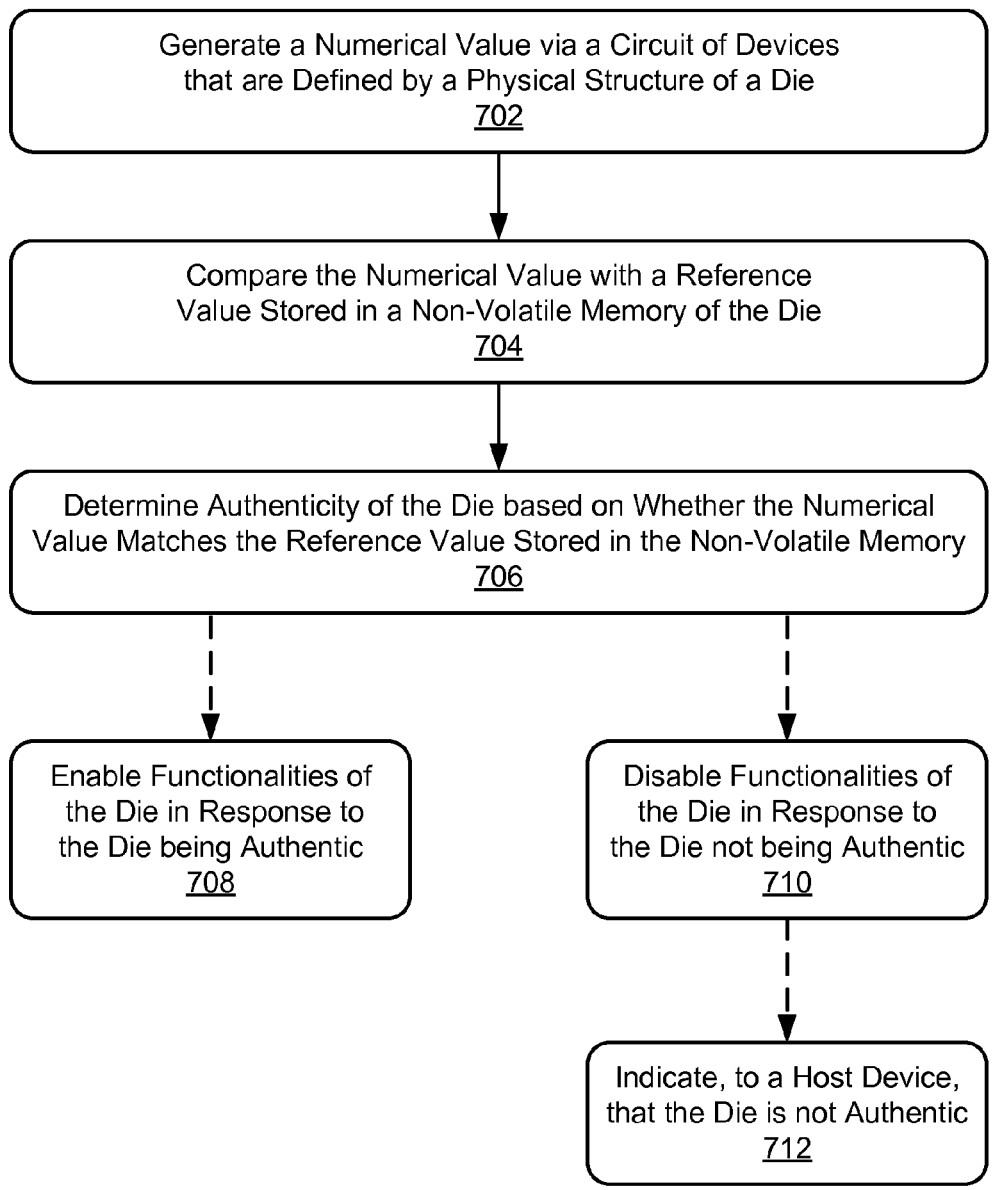
FIG. 7 illustrates an example method of authentication based on values of unobservable devices of a die.

FIG. 7 depicts a method 700 for verifying an authenticity of an integrated circuit die, including operations performed by authenticator 140 of FIG. 1.

At 702, a numerical value is generated based on respective values of a die's unobservable logic devices. The numerical value is generated via one or more circuits that include the die's unobservable devices. The circuit(s) in which the unobservable devices are embodied may be any suitable type of circuit, such as a sensing circuit configured to sense or measure the values of the unobservable devices. A size of the numerical value may range from a few bits to a few bytes of binary numbers.

In some aspects, operation 702, and others of method 700, are initiated in response to a power event or a security challenge event (e.g., attempting to activate secret functions or encryption) of the die. By way of example, consider a die configured as a controller for, and embodied on, an inkjet printer cartridge. In response to a host printer applying power to the inkjet printer cartridge, authenticator 140 may initiate method 700 to verify that the die, and thus the inkjet printer cartridge, are an authentic OEM consumable for the host printer. Here, authenticator 140 queries a circuit of the die's unobservable devices to generate a numerical value based on respective values of the unobservable devices.

At 704, the numerical value is compared with the reference value stored in the non-volatile memory. The reference value reflects an identity of the die and is also based on the value of the die's unobservable devices. In some cases, the reference value is written to the non-volatile memory of the die during manufacture or test of the die. The reference value may also be stored in non-adjacent areas of the non-volatile memory to prevent attackers from discovering the reference value within the memory.

In the context of the present example, assume that a manufacturer of the inkjet printer cartridge controller stored a reference value in eFuses of the controller's die during a test stage of manufacturing. Authenticator 140 accesses the die's non-volatile memory to retrieve the reference value of the inkjet cartridge's controller and compares the numerical value with the retrieved reference value.

At 706, authenticity of the chip is determined based on whether the numerical value matches the reference value stored in the die's non-volatile memory. If the numerical value generated based on the die's unobservable devices matches the reference number, the die is determined to be authentic. Alternately, if the numerical value does not match the reference value stored in the die's non-volatile memory, the die is determined to be not authentic. In the ongoing example, assume that authenticator 140 determines that the inkjet printer cartridge is not authentic because the generated numerical value does not match the reference value stored in the eFuses of the controller.

From operation 706, method 700 may proceed to operation 708 or operation 710 depending on whether the die is determined to be authentic. Method 700 proceeds to operation 708 in response to the die being authentic. Alternately, method 700 proceeds to operation 710 in response to the die not being authentic.

At 708, functionalities of the die are enabled in response to determining that the die is authentic. In some cases, these functionalities are implemented via a normal or mission operating mode of the die. In such cases, the functionalities may include secret, secure, encryption, or cryptographic functions of the die that are normally protected. In the context of the present example, if the inkjet printer cartridge had been determined as authentic, authenticator 140 would enable ink dispensing and host communication functions of the inkjet cartridge.

At 710, functionalities of the die are disabled in response to determining that the die is not authentic. The functionalities that are disabled may include secret, secure, encryption, or cryptographic functions of the die that an OEM manufacture desires to protect. Alternately or additionally, some functions of the die, and thus a peripheral on which the die is embodied, may be enabled at a limited level of performance or at a reduced capacity.

In the ongoing example, authenticator 140, which is embodied on a counterfeit inkjet printer cartridge, disables some functions of the inkjet printer cartridge's controller, such as enhanced communication with the host printer needed to facilitate advanced user interfaces and premium printing (e.g., photo printing or color printing). Additionally, authenticator 140 degrades other aspects of the counterfeit cartridge's performance, such as by increasing ink consumption to exhaust the consumable ink of the counterfeit cartridge at a faster rate.

Optionally at 712, an indication that the die is not authentic is transmitted to a host device. This can be effective to enable the host device to take one of many possible actions, such as indicating, to a user, that a die's peripheral is not authentic. Alternately or additionally, the host device may reject the peripheral on which the non-authentic die is embodied, by ceasing to function correctly or performing at a degraded level.

Concluding the present example, authenticator 140 transmits an indication to host authenticator 120 indicating that the inkjet printer cartridge is not an authentic cartridge for the host printer. In response to this indication, host authenticator 120 causes the host printer to perform at a degraded level, such as by slowing a rate of printing, over-using ink, or by printing off-color.

System-on-Chip

Figure 8:
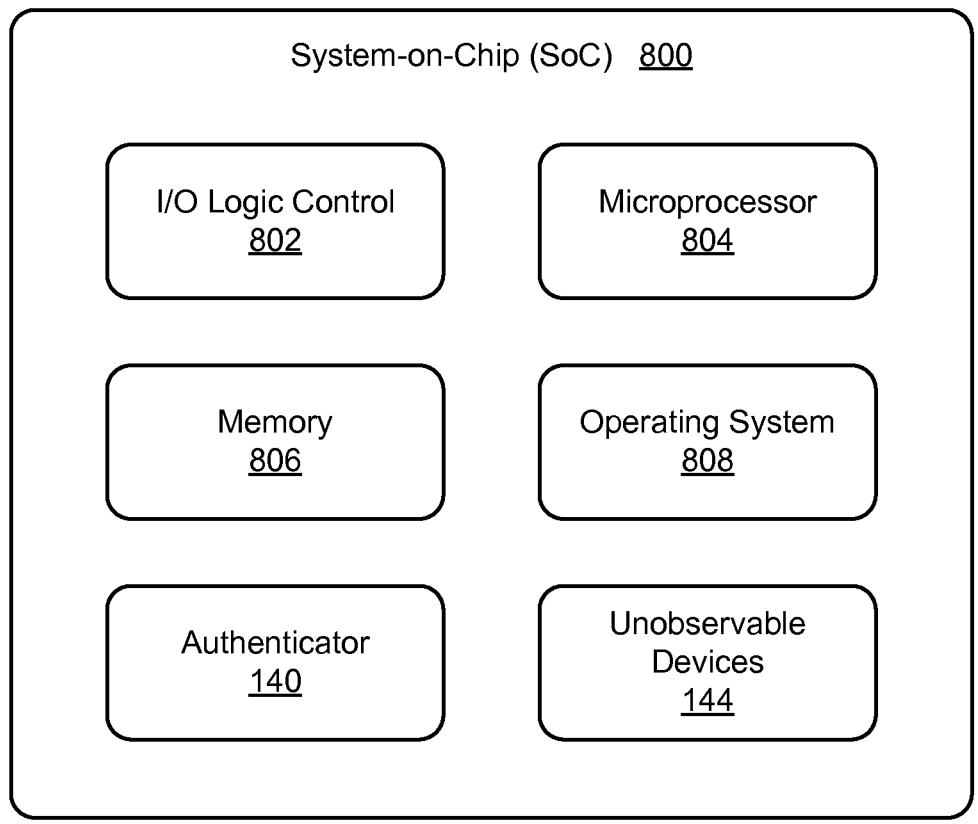
FIG. 8 illustrates a System-on-Chip (SoC) environment for implementing aspects of the techniques described herein.

FIG. 8 illustrates a System-on-Chip (SoC) 800, which can implement, or be implemented by, various aspects of device-based die authentication. A SoC can be implemented in any suitable device, such as a video game console, IP-enabled television, smart-phone, computer, access point, server, network-attached storage (NAS) device, network-enabled printer, set-top box, printer, scanner, home appliance, smart thermostat, home automation device, and/or any other type of electronic device. Alternately or additionally, SoC 800 may be implemented in any suitable peripheral, accessory, or consumable component, such as a battery, battery pack, battery charger, video game, video game controller, USB device, digital-video-disc (DVD), printer cartridge, water filter cartridge, automotive part or accessory, and the like.

SoC 800 can be integrated with electronic circuitry, a microprocessor, memory, input-output (I/O) logic control, communication interfaces, other hardware, firmware, and/or software needed to provide functionalities of a device, such as any of the above-listed devices. SoC 800 can also include an integrated data bus (not shown) that couples the various components of the SoC for data communication between the components, such as a crossbar or switch fabric.

In this example, SoC 800 includes various components such as an input-output (I/O) logic control 802 (e.g., to include electronic circuitry) and microprocessor 804. SoC 800 also includes memory 806, which can be any type and/or combination of RAM, SRAM, DRAM, Flash, low-latency nonvolatile memory, ROM, one-time programmable (OTP) memory, electronic fuses, and/or other suitable electronic data storage. Alternately or additionally, SoC 800 may comprise data interfaces (not shown) for accessing additional or external off-chip memory, such as external SRAM, DRAM, or Flash memory. SoC 800 can also include various firmware and/or software, such as operating system(s) 808, which can be computer-executable instructions maintained by memory 806 and executed by microprocessor 804. SoC 800 may also include other various communication interfaces and components embodied as hardware, firmware, software, or any suitable combination thereof.

SoC 800 also includes authenticator 140 and unobservable devices 144 (either of which may embodied as disparate or combined components). Examples of these various components, functions, and/or entities, and their corresponding functionality, are described with reference to the respective components of the environment 100 and various configurations as illustrated by FIGS. 2-7. Authenticator 140, either independently or in combination with other entities (e.g., storage controller 132), can be implemented as computer-executable instructions maintained by memory 806 and executed by microprocessor 804 to implement various embodiments and/or features described herein. Authenticator 140 may also be provided integral with other entities of the SoC, such as integrated a memory controller associated with memory 806 or another suitable software, firmware, or hardware component within SoC 800. Alternatively or additionally, Authenticator 140 and/or unobservable devices 144 and the other components can be implemented as hardware, firmware, fixed logic circuitry, or any combination thereof that is implemented in connection with the I/O logic control 802 and/or other signal processing and control circuits of SoC 800.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
   applying, to a semiconductor layer of a die, a mask configured to expose areas of the semiconductor layer that correspond to a subset of devices defined by the structure of the die;
   randomly varying an intensity of a particle beam applied to the exposed areas of the semiconductor layer effective to randomize respective values of the subset of devices, the intensity of the particle beam randomly varied while the particle beam traverses the semiconductor layer of the die;

generating, via a circuit comprising the subset of devices, a numerical value based on the respective values of the subset of devices; and writing the numerical value to a non-volatile memory of the die to associate the numerical value with the die to enable subsequent authentication of the die based on the respective values of the subset of devices.

2. The method as recited in claim 1, wherein the subset of devices includes capacitors, other devices of the die include resistors, and the circuit includes resistor-capacitor (RC) timing circuits formed by the resistors and the capacitors.

3. The method as recited in claim 2, wherein the RC timing circuits are operably associated with respective ring oscillator circuits such that the respective values of the capacitors effect a frequency of the respective ring oscillator circuits.

4. The method as recited in claim 3, wherein generating the numerical value comprises monitoring, via respective counters, outputs of the respective ring oscillator circuits.

5. The method as recited in claim 1, wherein the die is one of multiple dies residing on a wafer, the particle beam is applied to each of the multiple dies, and randomly varying the intensity of the particle beam is effective to cause each of the multiple dies to generate a different numerical value.

6. The method as recited in claim 1, further comprising applying, to another semiconductor layer of the die, another mask to expose areas of the other semiconductor layer that correspond to another subset of devices defined by the structure of the die; varying the intensity of the particle beam applied to the exposed areas of the other semiconductor layer effective to vary respective values of the other subset of devices; and wherein the numerical value is generated via a circuit comprising, and is based on the respective values of, the subset of devices and the other subset of devices.

7. A method comprising:
applying, to a semiconductor layer of multiple instances of a die, a mask configured to expose different areas of each instance's semiconductor layer, the different areas of each instance corresponding to different subsets of devices defined by the structure of the die;

randomly varying an intensity of a particle beam applied to the different areas of the semiconductor layer effective to randomize respective values of the different subsets of devices, the intensity of the particle beam randomly varied while the particle beam traverses the different areas of the semiconductor layer;

generating, for an instance of the die, a numerical value based on the values of the instance's subset of devices, the numerical value different for each instance of the die; and writing, to a non-volatile memory of the instance of the die, each instance's numerical value to enable subsequent authentication of each instance of the die based on each instance's subset of devices.

8. The method as recited in claim 7, wherein the numerical value is generated via a circuit of the die that includes at least some devices that are common between the different subsets of devices.

9. The method as recited in claim 7, wherein the devices include transistors and applying the particle beam to the semiconductor layer is effective to alter respective threshold voltages of the transistors.

10. The method as recited in claim 9, wherein the transistors are implemented as part of a logical circuit configured to generate the numerical value for the die.

11. The method as recited in claim 7, wherein the multiple instances of the die are embodied on a wafer and the mask is configured such that the numerical value of each instance of the die on the wafer is unique.

12. The method as recited in claim 7, wherein a size of the numerical value includes a range of four bits to 32 bits.

13. The method as recited in claim 7, wherein the non-volatile memory of the die includes one-time programmable memory or electronic-fuses.

14. The method as recited in claim 7, wherein the devices include capacitors and applying the particle beam to the semiconductor layer is effective to randomize respective capacitances of the capacitors.

15. The method as recited in claim 14, wherein each instance of the die includes resistors and the numerical value for each instance of the die is generated based on resistor-capacitor (RC) timing circuits formed by the resistors and the capacitors having the randomized capacitances.

16. One or more computer-readable storage devices storing processor-executable instructions that, responsive to execution by one or more processors, implement operations comprising:
applying, to a semiconductor layer of a die, a mask configured to expose areas of the semiconductor layer that correspond to a subset of devices defined by the structure of the die;

randomly varying an intensity of a particle beam applied to the exposed areas of the semiconductor layer effective to randomize respective values of the subset of devices, the intensity of the particle beam randomly varied while the particle beam traverses the semiconductor layer of the die;

generating, via a circuit comprising the subset of devices, a numerical value based on the respective values of the subset of devices; and writing the numerical value to a non-volatile memory of the die to associate the numerical value with the die to enable subsequent authentication of the die based on the respective values of the subset of devices.

17. The one or more computer-readable storage devices as recited in claim 16, wherein the subset of devices includes capacitors, other devices of the die include resistors, and the circuit includes resistor-capacitor (RC) timing circuits formed by the resistors and the capacitors.

18. The one or more computer-readable storage devices as recited in claim 17, wherein the RC timing circuits are operably associated with respective ring oscillator circuits such that the respective values of the capacitors affect a frequency of the respective ring oscillator circuits.

19. The one or more computer-readable storage devices as recited in claim 18, wherein the operation to generate the numerical value further comprises monitoring, via respective counters, outputs of the respective ring oscillator circuits.

20. The one or more computer-readable storage devices as recited in claim 16, wherein the die is one of multiple dies residing on a wafer, the particle beam is applied to each of the multiple dies, and randomly varying the intensity of the particle beam is effective to cause each of the multiple dies to have a different numerical value.

* * * * *